United States Patent
Nandakumaran et al.

(10) Patent No.: US 11,632,445 B2
(45) Date of Patent: Apr. 18, 2023

(54) PACKET RECIRCULATION FOR TUNNELING ENCAPSULATION

(71) Applicant: Arista Networks, Inc., Santa Clara, CA (US)

(72) Inventors: Purushothaman Nandakumaran, Milpitas, CA (US); Munisha Rani, Bengaluru (IN)

(73) Assignee: ARISTA NETWORKS, INC., Santa Clara, CA (US)

( * ) Notice: Subject to any disclaimer, the term of this patent is extended or adjusted under 35 U.S.C. 154(b) by 89 days.

(21) Appl. No.: 17/208,174

(22) Filed: Mar. 22, 2021

(65) Prior Publication Data

US 2022/0303364 A1  Sep. 22, 2022

(51) Int. Cl.
*H04L 69/18* (2022.01)
*H04L 69/08* (2022.01)

(52) U.S. Cl.
CPC .............. *H04L 69/18* (2013.01); *H04L 69/08* (2013.01); *H04L 2212/00* (2013.01)

(58) Field of Classification Search
CPC ...... H04L 69/18; H04L 69/08; H04L 2212/00
USPC ........................................................ 370/467
See application file for complete search history.

(56) References Cited

U.S. PATENT DOCUMENTS

| | | | |
|---|---|---|---|
| 10,644,985 B1 | 5/2020 | Rathnamaiah et al. | |
| 2006/0114831 A1 | 6/2006 | Buduma et al. | |
| 2007/0171838 A1 | 7/2007 | Baden | |
| 2013/0044763 A1* | 2/2013 | Koponen | H04L 41/122 370/401 |
| 2016/0261428 A1* | 9/2016 | Song | H04L 45/745 |
| 2017/0041209 A1* | 2/2017 | Joshi | H04L 43/20 |
| 2021/0243253 A1 | 8/2021 | Pang et al. | |
| 2021/0377171 A1 | 12/2021 | Esposito et al. | |

OTHER PUBLICATIONS

S. Miano, F. Risso and H. Woesner, "Partial offloading of Open Flow rules on a traditional hardware switch ASIC," 2017 IEEE Conference on Network Softwarization (NetSoft), 2017, pp. 1-9, doi: 10.1109/N ETSOFT.2017.8004107.

* cited by examiner

Primary Examiner — Christopher R Crompton
(74) Attorney, Agent, or Firm — Fountainhead Law Group PC

(57) ABSTRACT

Techniques for operating a network device for multiple packet encapsulation for different tunnels are provided. In some embodiments, the network device may receive an original packet on an ingress port, the original packet being received from a first host and addressed to a second host; encapsulate the original packet in a first tunnel packet for a first tunnel; recirculate the first packet through a loopback port; encapsulate the recirculated packet in a second tunnel packet for a second tunnel; and egress the packet encapsulated for the second tunnel. The switch may further add a first tunnel header to the original packet to encapsulate the first packet and add a second tunnel header to the recirculated packet to encapsulate the recirculated packet.

20 Claims, 12 Drawing Sheets

470

```
SW_1 Configuration VTEP1 100.1.1.1 int Loopback1
   ip addr 100.1.1.1/32
!!
interface Vxlan1
   vxlan source-interface Loopback1
   vxlan vlan 100 vni 10000
   vxlan flood vtep 200.1.1.1
!!
ip route 200.1.1.1/32 Tunnel2    <<<<----VTEP2 is
reachable via a GRE tunnel
!!
interface Tunnel2
   ip address 50.1.1.1/24
   tunnel mode gre
   tunnel source 162.1.1.161
   tunnel destination 180.1.1.10
```

480

```
SW_2 Configuration VTEP2 200.1.1.1 int Loopback1
   ip addr 200.1.1.1/32
!!
interface Vxlan1
   vxlan source-interface Loopback1
   vxlan vlan 100 vni 10000
   vxlan flood vtep 100.1.1.1
```

| DA SW_1 MAC ADDR 512 | SA HOST_1 MAC ADDR 514 | SIP HOST_1 10.1.1.2 516 | DIP HOST_2 4.4.4.4 518 |

520:

| DA SW_A NEXT HOP MAC ADDR 522 | SA SW_1 MAC ADDR 524 | SIP SW_1 GRE ENDPT 162.1.1.161 526 | DIP SW_N GRE ENDPT 180.1.1.10 528 | SIP HOST_1 10.1.1.2 516 | DIP HOST_2 4.4.4.4 518 |

GRE HEADER

530:

| DA SW_A NEXT HOP MAC ADDR 532 | SA SW_1 MAC ADDR 534 | SIP SW_1 VTEP1 100.1.1.1 536 | DIP SW_2 VTEP2 200.1.1.1 538 | DA SW_A NEXT HOP MAC ADDR 522 | SA SW_1 MAC ADDR 524 | SIP SW_1 GRE ENDPT 162.1.1.161 526 | DIP SW_N GRE ENDPT 180.1.1.10 528 | SIP HOST_1 10.1.1.2 516 | DIP HOST_2 4.4.4.4 518 |

VXLAN HEADER

570

SW_1 Configuration GRE Endpoint 162.1.1.161

```
interface Tunnel1
   ip address 50.1.1.1/24
   tunnel mode gre
   tunnel source   162.1.1.161
   tunnel destination 180.1.1.10
!!!!
int Loopback1
   ip addr 100.1.1.1/32
!!
ip route 180.1.1.10/32 Vxlan1    <<<<----GRE endpoint is
reachable over a Vxlan tunnel
!!
interface Vxlan1
   vxlan source-interface Loopback1
   vxlan vlan 100 vni 10000
   vxlan flood vtep 200.1.1.1
```

580

SW_2 Configuration GRE Endpoint 180.1.1.10

```
int Loopback1
   ip addr 200.1.1.1/32
!!
interface Tunnel1
   ip address 50.1.1.1/24
   tunnel mode gre
   tunnel source   162.1.1.161
   tunnel destination 180.1.1.10
```

```
tcpdump: listening on cal215-et3, link-type EN10MB
(Ethernet), capture size 262144 bytes
03:46:52.617382 74:83:ef:01:ca:bc > 00:00:33:33:33:33,
ethertype IPv4 (0x0800), length 134: (tos 0x0, ttl 64, id
2,
 offset 0, flags [DF], proto UDP (17), length 120)
    100.1.1.1.7721 > 200.1.1.1.4789: VXLAN, flags [I]
(0x08), vni 123121
74:83:ef:01:ca:bc > 00:00:22:22:22:22, ethertype IPv4
(0x0800), length 84: (tos 0xa,ECT(0), ttl 63, id 9,
offset 0,
 flags [none], proto GRE (47), length 70)
    162.1.1.161 > 180.1.1.10: GREv0, Flags [none], proto
IPv4 (0x0800), length 50
       (tos 0x0, ttl 63, id 0, offset 0, flags [none],
proto unknown (63), length 46)
    10.1.1.2 > 4.4.4.4:  ip-proto-63 26
 0x0000:  0000 3333 3333 7483 ef01 cabc 0800 4500
         0x0010:  0078 0002 4000 4011 0c6f 6401 0101 c801
         0x0020:  0101 1e29 12b5 0064 0000 0800 0000 01e0
         0x0030:  f100 0000 2222 2222 7483 ef01 cabc 0800
         0x0040:  450a 0046 0009 0000 3f2f 22c9 a201 01a1
         0x0050:  b401 010a 0000 0800 4500 002e 0000 0000
         0x0060:  3f3f 6887 0a01 0102 0404 0404 0001 0203
         0x0070:  0405 0607 0809 0a0b 0c0d 0e0f 1011 1213
         0x0080:  1415 1617 1819
```

FIG. 5D

PACKET RECIRCULATION FOR TUNNELING ENCAPSULATION

BACKGROUND

Data packets use networking protocols to get to their destinations. However, not all networks support all protocols. Consider a wide area network (WAN) connecting Location A and Location B. Location A and Location B each have networks that use a protocol such as IPv6. However, the network between Location A and Location B uses another version of the Internet Protocol, such as IPv4. In this example, by encapsulating IPv6 packets inside IPv4 packets, IPv6 can be used at Locations A and B, while still sending data directly between Locations A and B. Encapsulating packets within other packets is called "tunneling." Tunnels are a way to transport data across a network using protocols that are not supported by that network.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 4C illustrates configurations, in accordance with some embodiments of the disclosure.

FIG. 5B illustrates another packet encapsulation, in accordance with some embodiments of the disclosure.

FIG. 5C illustrates further configurations, in accordance with some embodiments of the disclosure.

FIG. 5D illustrates an example packet dump, in accordance with some embodiments of the disclosure.

DETAILED DESCRIPTION

Overview

Figure 1:
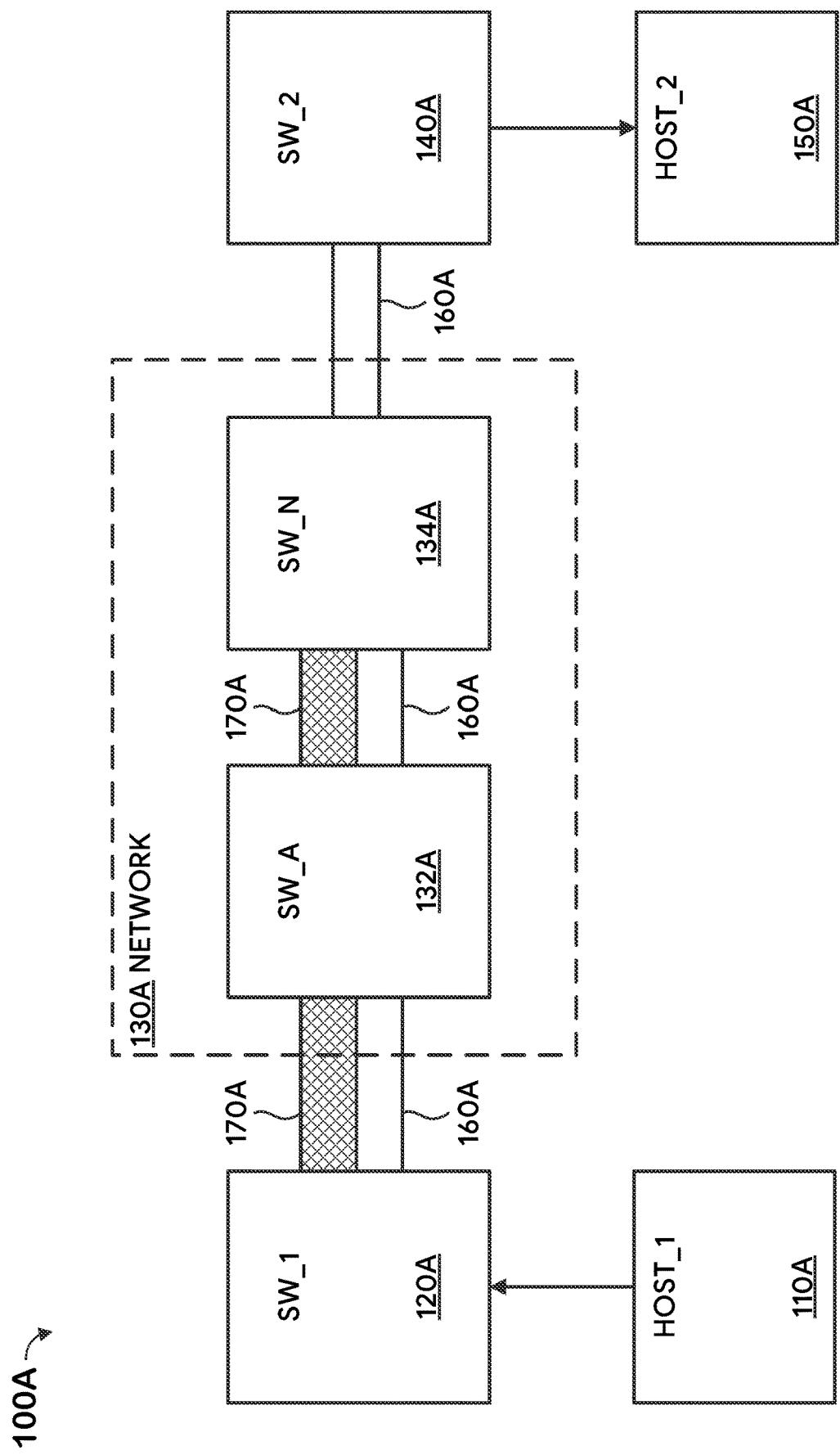
FIG. 1 illustrates a network topology, in accordance with some embodiments of the disclosure.

The present disclosure describes systems and techniques for operating a network device (e.g., switch, router, and the like) to perform multiple packet encapsulation for different tunnels. To send packets in one tunnel (tunnel 1) through another tunnel (tunnel 2), an originating network device may encapsulate the packets twice. In the first pass through the network device's forwarding pipeline, the packet may be encapsulated for tunnel 1. In the second pass through the network device's forwarding pipeline, the packet may be encapsulated for tunnel 2.

An example configuration may be referred to as VXLAN over GRE, where tunnel 1 is Virtual Extensible LAN (VXLAN) and tunnel 2 is Generic Routing Encapsulation (GRE). Consider two hosts (host 1 and host 2) that communicate with each other through a VXLAN tunnel. Host 1 is connected to switch 1 and host 2 is connected to switch 2. Switch 1 and switch 2 are VXLAN tunnel endpoints, the VXLAN tunnel originating at one side and terminating at the other side. Typically, they are reached through an Internet Protocol (IP) fabric. In this example, switch 1 does not have a direct way to reach switch 2 over VXLAN. However, switch 2 may be reached by switch 1 via a GRE tunnel. Between switch 1 and switch 2 is switch 3. Switch 1 may reach switch 3 through a GRE tunnel. Switch 3 may then reach switch 2 through the VXLAN tunnel.

Switch 1 receives a packet from host 1 and the packet is addressed to host 2. The packet processor in switch 1 encapsulates the packet in a VXLAN packet. The VXLAN packet is looped back into the packet processor of switch 1, where the VXLAN packet is encapsulated in a GRE packet. The GRE packet egresses switch 1 and goes to switch 3 through a GRE tunnel. Switch 3 decapsulates the VXLAN packet from the GRE packet. The VXLAN packet egresses switch 3 and goes to switch 2 through the VXLAN tunnel. Switch 2 decapsulates the original packet from the VXLAN packet and forwards the original packet to host 2.

GRE over VXLAN may also be performed using these techniques. More generally, this double encapsulation is applicable to other tunneling technologies.

Network Topology

FIG. 1 illustrates topology 100A for a data network according to some embodiments. Topology 100A may include host_1 110A, switch_1 120A, network 130A, switch_2 140A, and host_2 150A. Network 130A may include one or more switches, such as switch_A 132A through switch_N 134A. Network 130A may be a segmented routing over Internet Protocol (IP) (layer 3) network.

Host_1 110A and host_2 150A may be computing devices, such as servers, desktop computers, laptop computers, tablet computers, smartphones, and the like. Host_1 110A and host_2 150A may communicates with switch_1 120A and switch_2 140A, respectively, directly or through one or more intermediate network devices (not shown). Hosts communicate with each other over one or more networks, such as network 130A. The networks may include nodes such as switch_1 120A, switch_A 132A through switch_N 134A, and switch_2 140A. Although the nodes depicted in FIG. 1 are labeled as switches, they may be other network devices, such as routers and the like. Switch_1 120A, switch_A 132A through switch_N 134A, and switch_2 140A may be embodiments of network device 600 in FIG. 6. Switch_A 132A represents a network device in network 130A that communicates with switch_1 120A. There may be one or more network devices (not shown) between switch_A 132A and switch_N 134A. Switch_N 134A may communicate with switch_2 140A directly or through one or more intermediate network devices (not shown).

Suppose host_1 110A communicates with host_2 150A using a first tunneling protocol (through tunnel X 160A), such as Virtual Extensible LAN (VXLAN), Generic Routing Encapsulation (GRE), Multiprotocol Label Switching (MPLS), IPinIP, and the like. VXLAN is an encapsulation protocol that uses tunneling to stretch layer 2 connections over an underlying layer 3 network. GRE is a protocol for encapsulating data packets that use one routing protocol inside the data packets of another protocol. A data packet may be a formatted unit of data carried by a data network. A data packet may include control information and user data (payload).

In this example, host_1 110A communicates with switch_1 120A, and host_2 150A communicates with switch_2 140A. Switch_1 120A and switch_2 140A are endpoints for tunnel X 160A. Accordingly, switch_1 120A and switch_2 140A may have endpoint addresses associated with the tunneling protocol used by tunnel X 160A. Switch_1 120A may encapsulate data packets from host_1 110A for communication through tunnel X 160A. Switch_2 140A may decapsulate data packets for host_2 150A received through tunnel X 160A. Switch_1 may communicate with switch_2 through network 130A.

Suppose further that switch_A 132A does not recognize switch_2's 140A endpoint address for tunnel X 160A. A forwarding table in switch_A 132A may not be programmed with switch_2's 140A endpoint address for tunnel X 160A. This may be, for example, because switch_2 140A does not advertise its endpoint address for tunnel X 160A on network 130A.

However, switch_N 134A may recognize switch_2's 140A endpoint address for tunnel X 160A. In addition, switch_1 120A may reach switch_N 134A through a second tunneling protocol (through tunnel Y 170A). The second tunneling protocol may be GRE, VXLAN, Multiprotocol Label Switching (MPLS), IPinIP, and the like. Typically, tunnel X 160A and tunnel Y 170A use different tunneling protocols. Here, switch_1 120A may also be an endpoint for tunnel Y 170A, and switch_N may be an endpoint for tunnel Y 170A. Switch_A 132A may recognize switch_N's 134A endpoint address for tunnel Y 170A.

In this example, switch_1 120A may encapsulate a data packet from host_1 110A to host_2 150A twice: once for tunnel X 160A and then for tunnel Y 170A. Since the data packet encapsulated for tunnel X 160A is further encapsulated for tunnel Y 170A, tunnel X 160A may be said to be "over" tunnel Y 170A ("tunnel X over tunnel Y"). By way of example and not limitation, "VXLAN over GRE" and "GRE over VXLAN" are described in further detail below. The twice-encapsulated data packet may go from switch_1 120A to switch_N 134A through tunnel Y 170A. Switch_N 134A may decapsulate the data packet, leaving the data packet encapsulated for tunnel X 160A, and forward the data packet to switch_2 140A. Switch_2 140A may decapsulate the data packet and forward the data packet to host_2 150A.

Tunnel Y 170A is depicted above tunnel X 160A to convey that packets for tunnel X 160A are transported over/via tunnel Y 170A. A header for tunnel Y 170A protocol may be the outermost header in the data packet and forwarding lookups will be performed on outer tunnel Y 170A protocol header on intermediate switches switch_A 132A through switch_N 134A.

Network Device

Figure 2A:
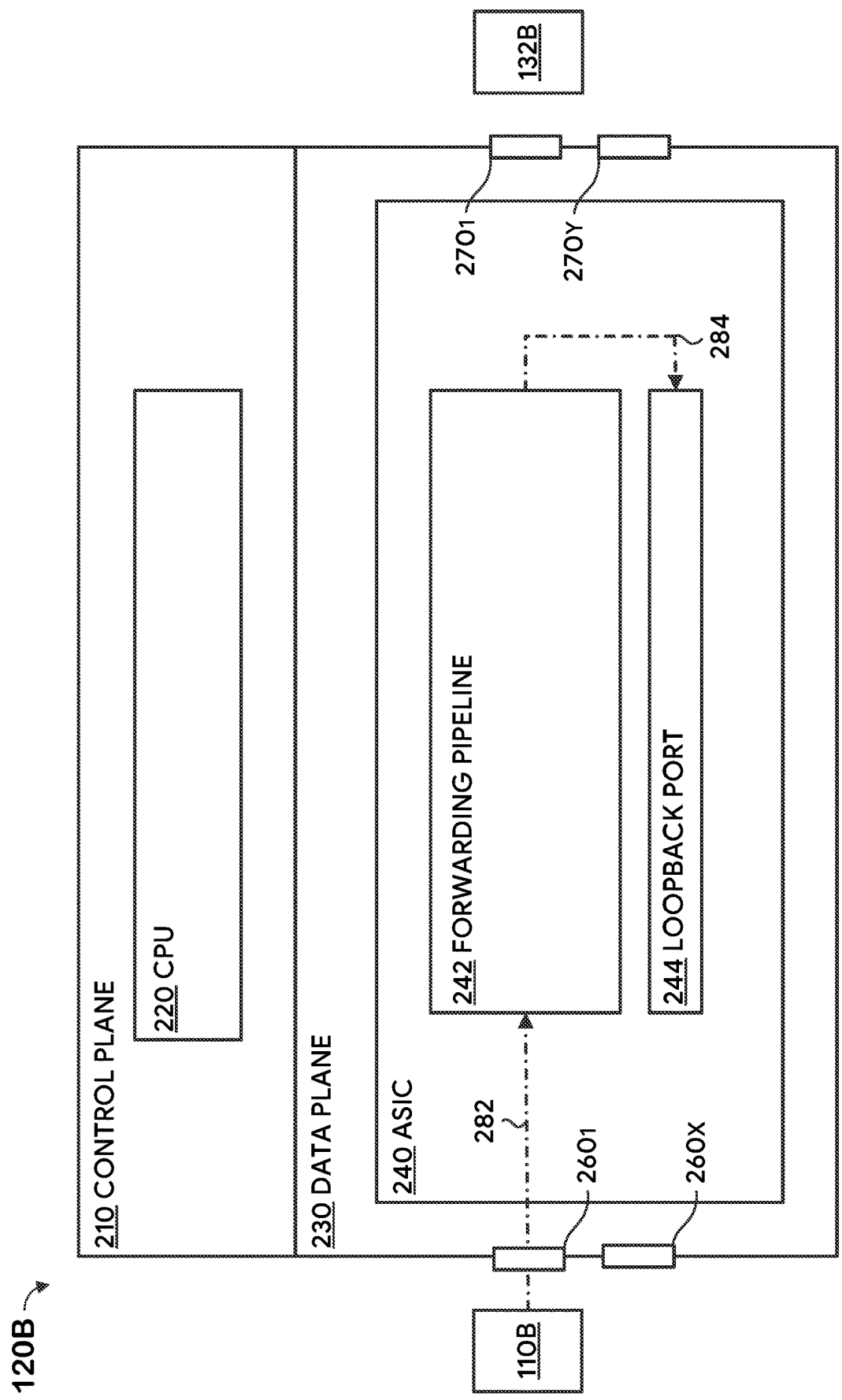
FIGS. 2A and 2B illustrate a network device, in accordance with some embodiments of the disclosure.
Figure 2B:
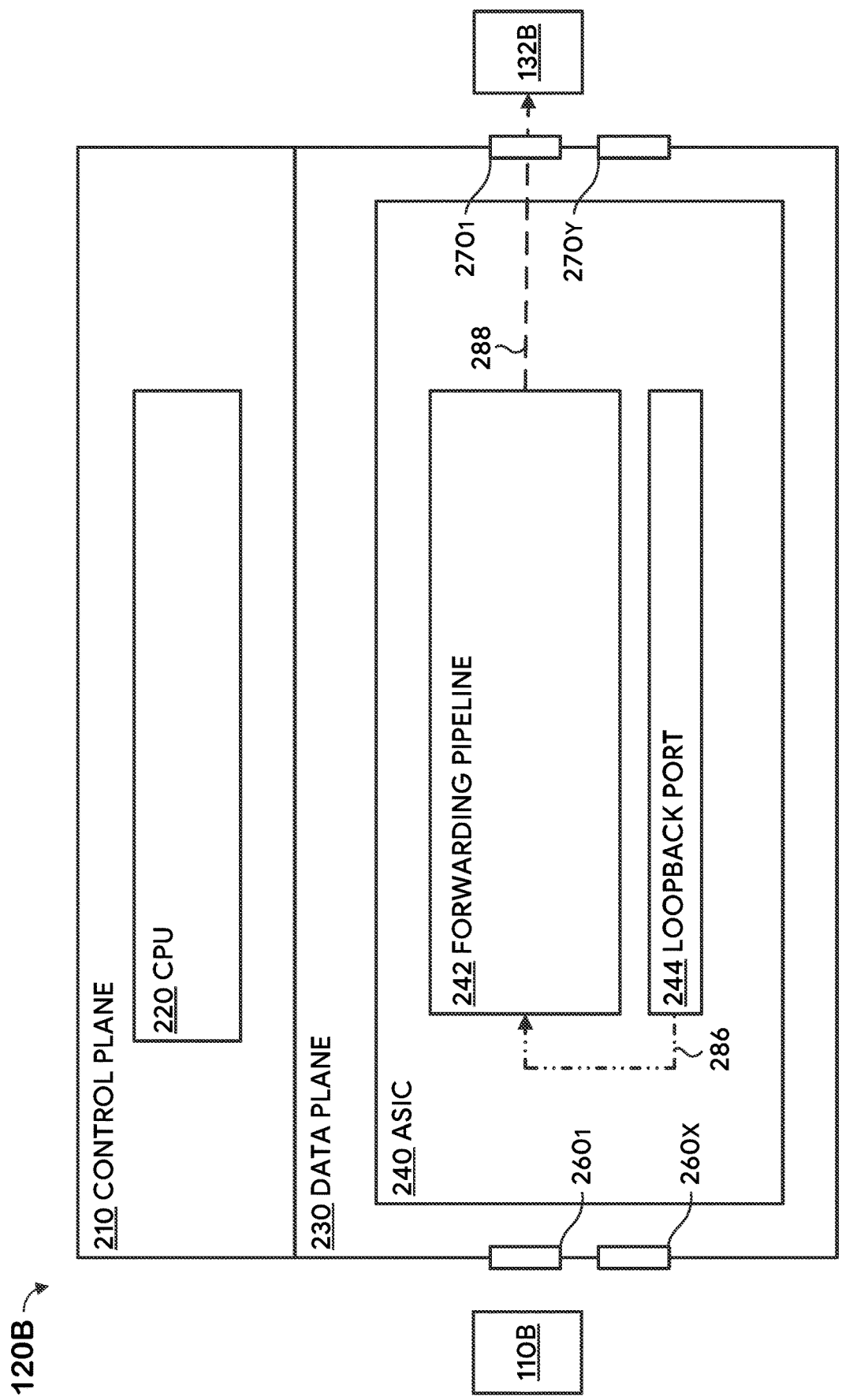

FIGS. 2A and 2B illustrate switch_1 120B according to some embodiments. The following description of FIGS. 2A and 2B is made with reference to FIG. 1. Switch_1 120E may be an embodiment of switch_1 120A. Switch_1 120E may comprise control plane 210 and data plane 230. Control plane 210 may include CPU 220 which may be an embodiment of management CPU 108 described in FIG. 6. Data plane 230 may include forwarding application specific integrated circuit (ASIC) 240, ingress ports $260_1$-$260_X$, and egress ports $270_1$-$270_Y$. ASIC 240 may be an embodiment of packet processor 112a-112p described in FIG. 6. ASIC 240 may comprise forwarding pipeline 242 and loopback port 244.

Switch_1 120E may receive data packet 110E from host_1 110A. Data packet 110E may be addressed to host_2 150A. Data packet 110E may enter switch_1 120E through ingress port $260_1$ and go to forwarding pipeline 242 (path 282). Forwarding pipeline 242 may look up host_2 150A in a forwarding table (not shown) and determine that host_2 150A may be reached through tunnel X 160A. Forwarding pipeline 242 may encapsulate data packet 110B according to the protocol for tunnel X 160A. The forwarding table defines how a data packet will be forwarded out of a network device. The forwarding table may match data packet header fields, such as the IP destination address, and when a match occurs, forward the frame to a specified egress port (e.g., of egress ports $270_1$-$270_Y$).

ASIC 240's forwarding table may be programmed to take into account that switch_1 120A does not have a direct route to switch_2 140A. The route to switch_2 140A may be through tunnel Y 170A. Since control plane 210 knows that switch_2 140A is reachable via tunnel Y 170A, control plane 210 programs forwarding pipeline 242 so that the destination port is loopback port 244 and the data packet is recirculated. The packet encapsulated for tunnel X 160A may re-enter forwarding pipeline 242 through loopback port 244 (paths 284 and 286). Loopback port 244 provides a path for packets to be processed by forwarding pipeline 242 more than once. As shown, loopback port 244 may be an internal loopback provided by ASIC 240. For example, ASIC 240 may have one or more dedicated internal loopback ports with unique port numbers. When a data packet is directed to a dedicated internal loopback port, the data packet may enter forwarding pipeline 242 again. Here, the recirculated packet may stay in ASIC 240 and not go to one of egress ports $270_1$-$270_Y$. Loopback port 244 may also be one of egress ports $270_1$-$270_Y$. In other words, some of egress ports $270_1$-$270_Y$ are dedicated external loopback ports. A data packet sent to a dedicated external loopback port may be returned to forwarding pipeline 242. For example, the dedicated external loopback port may be configured to return the data packet within switch_1 120B to forwarding pipeline 242, may have a special adapter/plug/cable to send the data packet going out from an external loopback port back into switch_1 120E through one of ingress ports $260_1$-$260_X$, and the like. Going to forwarding pipeline 242 again may be referred to as packet recirculation. The second time through forwarding pipeline 242, the packet encapsulated for tunnel X 160A may be further encapsulated according to the protocol for tunnel Y 170A. The twice-encapsulated data packet (data packet 132B) egresses switch_1 120E through egress port $270_1$ (path 288)

Packet Recirculation Workflow

Figure 3:
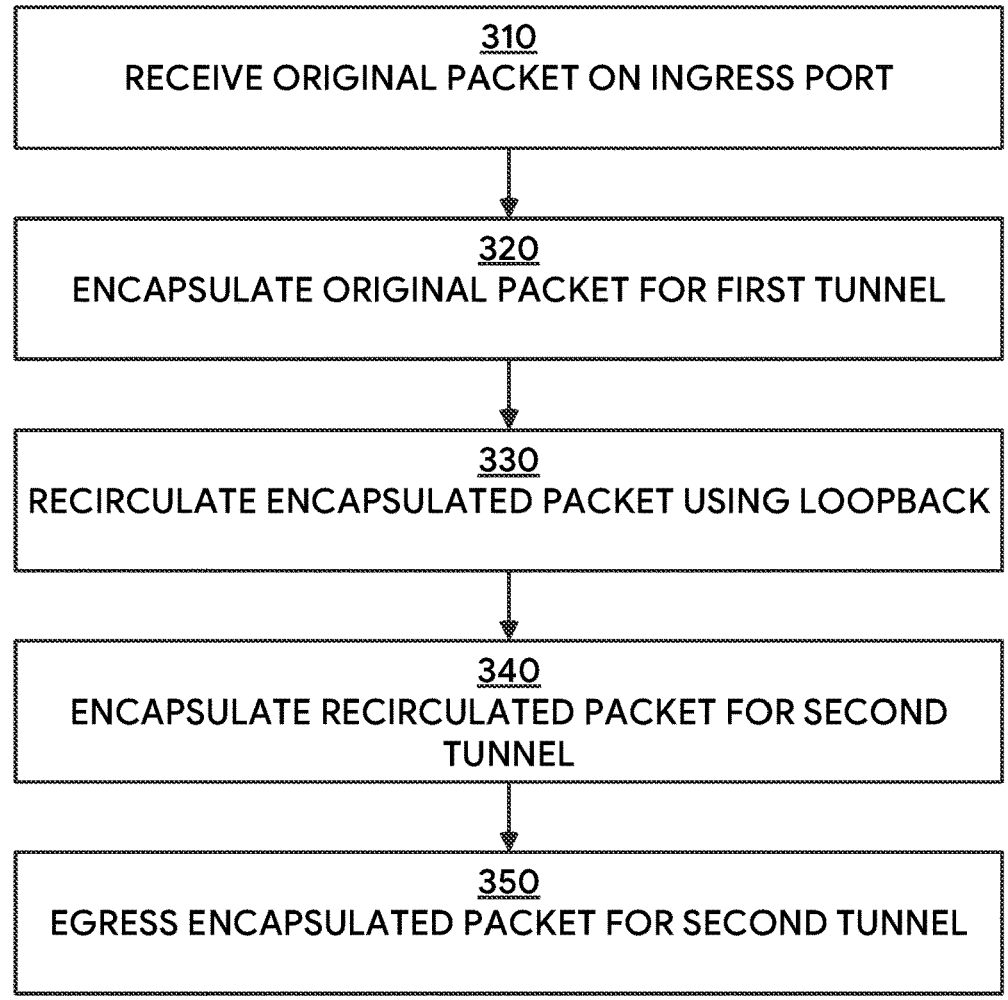
FIG. 3 illustrates a flow diagram of a method for encapsulating packets, in accordance with some embodiments of the disclosure.

FIG. 3 illustrates workflow 300 for packet recirculation according to some embodiments. Workflow 300 may be performed by switch_1 120B. Description of workflow 300 will be made with reference to FIGS. 1, 2A and 2B.

Workflow 300 may commence at step 310, where a switch_1 120B receives data packet 110B, referred to as the original packet. For example, data packet 110E may ingress switch_1 120E through ingress port $260_1$ and go to forwarding pipeline 242 (path 282). At step 320, packet 110E is encapsulated for the first tunnel. For example, forwarding pipeline 242 may encapsulate packet 110E according to the protocol for tunnel X 160A.

At step 330, the once-encapsulated packet (for the first tunnel) is recirculated back to forwarding pipeline 242 using loopback 244 (paths 284 and 286). At step 340, the once-encapsulated data packet may be encapsulated again in forwarding pipeline 242, this time for the second tunnel. For example, forwarding pipeline 242 may encapsulate the data packet according to the protocol for tunnel Y 170A.

At step 350, the twice-encapsulated data packet egresses switch_1 120E to the next hop for the second tunnel. For example, data packet 132E egresses through egress port $270_1$ to switch_A 132A.

VXLAN Over GRE

Figure 4A:
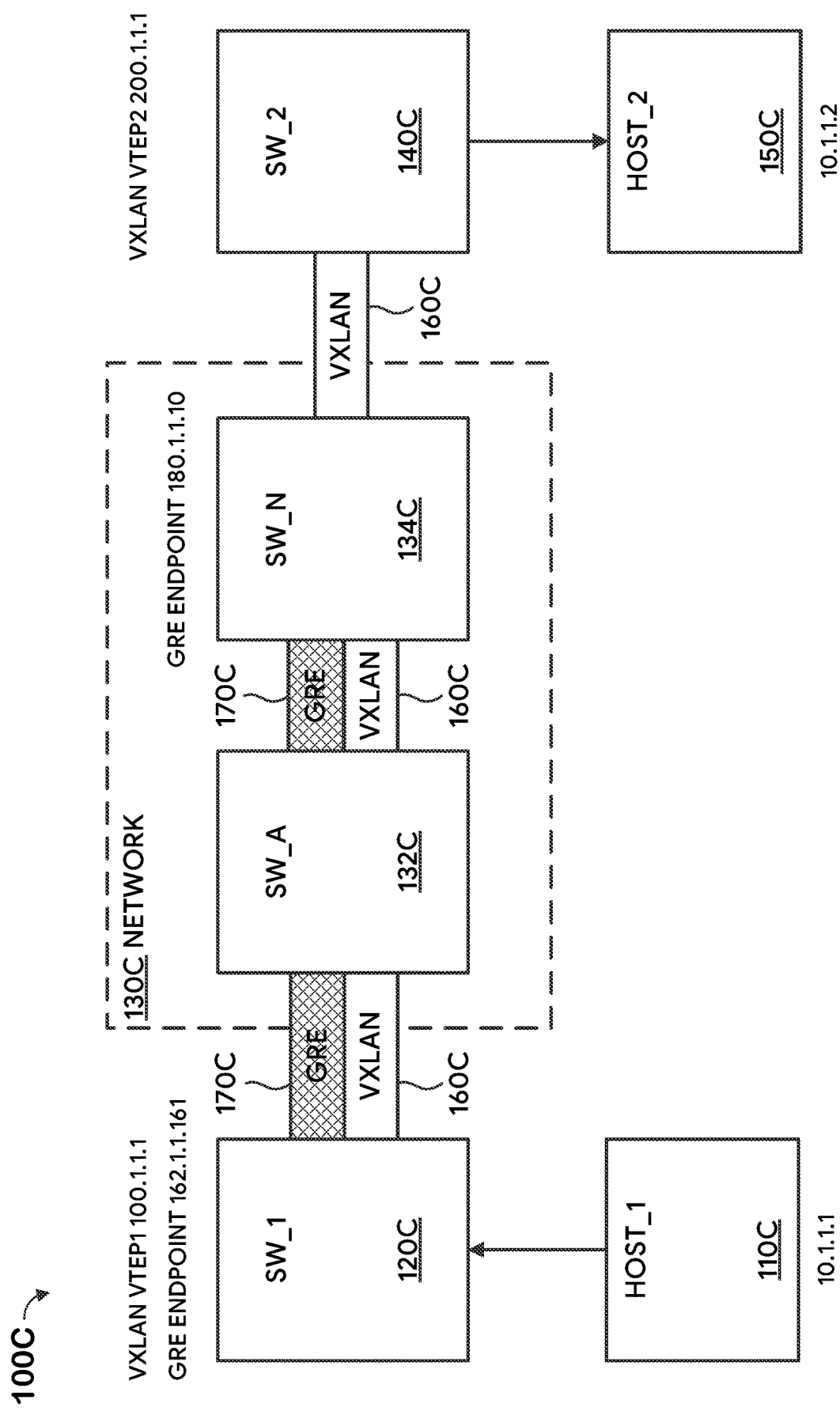
FIG. 4A illustrates a communication path, in accordance with some embodiments of the disclosure.

FIG. 4A illustrates communications path 100C for VXLAN over GRE according to some embodiments. Communications path 100C and its constituents may be an embodiment of topology 100A and its constituents. Switch_1 120C may be an embodiment of switch_1 120B. Moreover, switch_A 132C through switch_N 134C and switch_2 140C may each have at least some of the characteristics of switch_1 120B. Communications path 100C may include host_1 110C, switch_1 120C, network 130C, switch_2 140C, and host_2 150C. Network 130C may include switch_A 132C through switch_N 134C.

Switch_1 120C may be a VXLAN Tunnel End Point (VTEP), VTEP1, with an IP address of 100.1.1.1. Switch_1 120C may also be a GRE endpoint with an IP address of 162.1.1.161. Switch-N 134C may be a GRE endpoint with an IP address of 180.1.1.10. Switch_2 140C may be a VTEP, VTEP2, with an IP address of 200.1.1.1. Host_1 110C may have an IP address of 10.1.1.1 and host_2 150C may have an IP address of 10.1.1.2.

Host_1 110C may send a data packet, addressed to host_2 150C, to switch_1 120C. Switch_1 120C may determine that host_2 150C is behind a VXLAN tunnel with a destination IP address of 200.1.1.1, which is VTEP2. Switch_1 120C may encapsulate the data packet for VXLAN. Here, switch_1 120C adds a VXLAN header to the packet with an outer destination IP address of 200.1.1.1 and an outer destination Media Access Controller (MAC) address of Switch_1's 120C MAC address. Switch_1 120C may also determine that switch_1 120C does not have a direct route to reach outer destination IP address 200.1.1.1 and that address 200.1.1.1 is reached through a GRE tunnel. In other words, switch_1 120C may resolve that outer destination IP address of 200.1.1.1 for VXLAN tunnel 160C will go through GRE tunnel 170C. The forwarding tables in ASIC 240 may be programmed/configured such that first route/forwarding lookup for host_2 150C will produce loopback port 244 as the outgoing port. This resolution may be performed in control plane 210 and forwarding pipeline 242 is programmed/configured accordingly.

The VXLAN encapsulated data packet may be looped back and go through forwarding pipeline 242 of switch_1 120C again. The second pass through the forwarding pipeline may encapsulate the data packet for GRE (add a GRE header). The twice-encapsulated packet egresses switch_1 120C to switch_A 132C.

The twice-encapsulated packet may proceed through GRE tunnel 170C over network 130C until it reaches the GRE endpoint (switch_N 134C). Switch_N 134C may decapsulate the GRE encapsulated data packet, restoring the VXLAN encapsulated data packet. The VXLAN encapsulated data packet may proceed through VXLAN tunnel 160C to switch_2 140C. Switch_2 140C may decapsulate the VXLAN encapsulated data packet and forward the decapsulated data packet to host_2 150C.

A reverse path from host_2 150C to host_1 110C may be as follows. Switch_2 140C may receive a data packet from host_2 150C. Switch_2 140C may encapsulate the data packet with a VXLAN header and send the VXLAN encapsulated data packet to switch_N 134C. Switch_N may further encapsulate the packet with a GRE header and send it to switch_1 120C. Switch_1 120C may receive the twice-encapsulated data packet.

Analyzing the outer data packet header, switch_1 120 may see the packet is addressed to its own MAC address as the destination MAC address and to its GRE endpoint address as the destination IP address. Switch_1 120C may decapsulate the GRE encapsulated data packet, restoring the VXLAN encapsulated data packet. The VXLAN encapsulated data packet may be recirculated. During the second pass through the forwarding pipeline, the VXLAN encapsulated data packet may be decapsulated, based on the inner destination MAC address and destination IP address. Switch_1 120C may forward the data packet to host_1 110C.

Figure 4B:
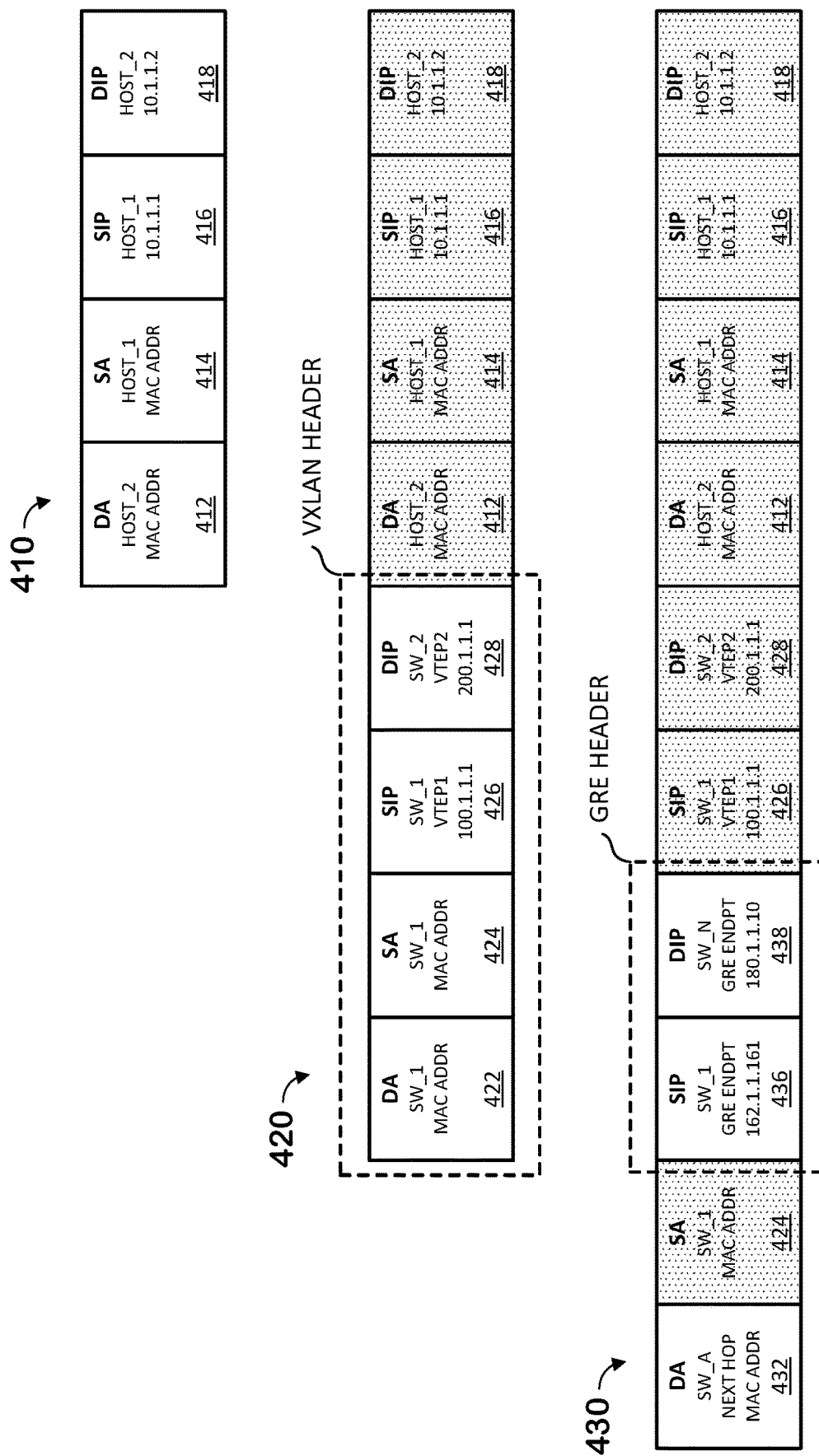
FIG. 4B illustrates packet encapsulation, in accordance with some embodiments of the disclosure.

FIG. 4B illustrates control information of a data packet after each pass through forwarding pipeline 242 of switch_1 120C, in accordance with various embodiments. The data packet payload is not depicted. The IP addresses shown in FIG. 4B correspond to the IP addresses shown in FIG. 4A. Header 410 may be the data packet header received from host_1 110C. Header 410 may include destination address 412, source address 414, source IP address 416, and destination IP address 418.

During the first pass through switch_1's 120C forwarding pipeline, a VXLAN header may be added, resulting in header 420. The VXLAN header may include destination address 422, source address 424, source IP address 426, and destination IP address 428.

During the second pass through switch_1's 120C forwarding pipeline, a GRE header may be added, resulting in header 430. The GRE header may include source IP address 436 and destination IP address 438. Destination address 432 may also be added.

FIG. 4C illustrates configuration information 470 for VTEP switch_1 110C and configuration information 480 for VTEP switch_2 140C, according to some embodiments. Configuration information 470 may set up a VXLAN tunnel; specify that VTEP2 is reachable over a GRE tunnel, and set up the GRE tunnel. Configuration information 480 may set up a VXLAN tunnel. For example, GRE tunnel destination 180.1.1.10 reachability may be either statically configured or dynamically learned through routing protocols.

GRE Over VXLAN

Figure 5A:
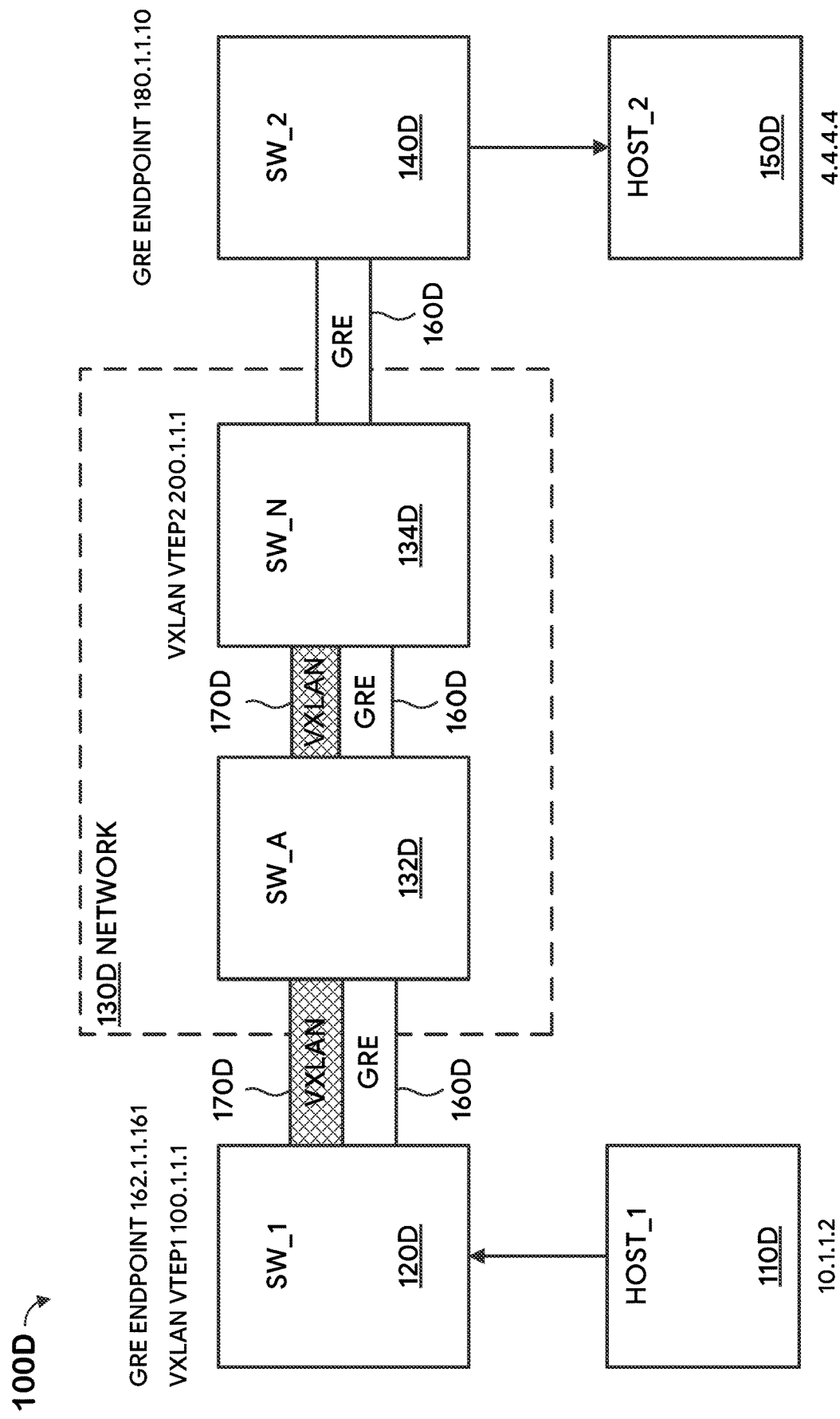
FIG. 5A illustrates another communication path, in accordance with some embodiments of the disclosure.

FIG. 5A illustrates communications path 100D for GRE over VXLAN according to some embodiments. Communications path 100D and its constituents may be an embodiment of topology 100A and its constituents. Switch_1 120D may be an embodiment of switch_1 120B. Moreover, switch_A 132D through switch_N 134D and switch_2 140D may each have at least some of the characteristics of switch_1 120B. Communications path 100D may include host_1 110D, switch_1 120D, network 130D, switch_2 140D, and host_2 150D. Network 130D may include switch_A 132D through switch_N 134D.

By way of non-limiting example, switch_1 120D may be in a headquarters and switch_2 140D in a branch office. There may be a point-to-point connection established between the headquarters and branch office using a GRE tunnel. Suppose switch_1 120D cannot reach the GRE endpoint at switch_2 140D, but can reach switch_N 134D over a VXLAN tunnel. Switch_N 134D can reach switch_2 140D over a GRE tunnel.

Switch_1 120D may be a GRE endpoint with an IP address of 162.1.1.161. Switch_1 120D may also be a VTEP, VTEP1, with an IP address of 100.1.1.1. Switch-N 134D may be a VTEP, VTEP2, with an IP address of 200.1.1.1. Switch_2 140D may be a GRE endpoint with an IP address of 180.1.1.10. Host_1 110D may have an IP address of 10.1.1.2 and host_2 150D may have an IP address of 4.4.4.4.

Host_1 110D and host_2 150D are in different subnet domains. When host_1 110D sends a data packet with a destination IP address of 4.4.4.4, the destination address may be switch_1's 120D MAC address. Since the data packet's destination address is switch_1's 120D MAC address, switch_1 120D may lookup destination IP address 4.4.4.4 in its forwarding table. Switch_1 120D may determine that host_2 150D is reachable through a GRE tunnel and encapsulates the data packet for GRE (add a GRE header). Switch_1 120D may also update the layer 2 Ethernet header destination address with the next hop's (switch_A 132D) MAC address and source address with switch_1's 120D MAC address.

The GRE encapsulated data packet may be looped back and go through forwarding pipeline 242 of switch_1 120D again. During the second pass through forwarding pipeline 242, the packet's destination address is not switch_1's 120D MAC address, so forwarding pipeline 242 may not perform layer 3 route lookup. Instead, forwarding pipeline 242 may perform layer 2 forwarding lookup. The layer 2 forwarding lookup may determine that the destination IP address of 180.1.1.10 and destination address of the next-hop switch's MAC address are reachable through VTEP2's IP address 200.1.1.1 (VXLAN tunnel 170D). Switch_1 120D may encapsulate the data packet for VXLAN (add a VXLAN header). The twice-encapsulated packet egresses switch_1 120D to switch_A 132D.

The twice-encapsulated packet may proceed through VXLAN tunnel 170D over network 130D until it reaches VTEP2 (switch_N 134D). Switch_N 134D may decapsulate the VXLAN encapsulated data packet, restoring the GRE encapsulated data packet. The GRE encapsulated data packet may proceed through GRE tunnel 160D to switch_2 140D. Switch_2 140D may decapsulate the GRE encapsulated data packet and forward the decapsulated data packet to host_2 150D.

A reverse path from host_2 150D to host_1 110D may be as follows. Switch_2 140D may receive a data packet from host_2 150D. Switch_2 140D may encapsulate the data packet with a GRE header and send the GRE encapsulated data packet to switch_N 134D. Switch_N may further encapsulate the packet with a VXLAN header and send it to switch_1 120D. Switch_1 120D may receive the twice-encapsulated data packet.

Analyzing the outer data packet header, switch_1 120D may see the packet is addressed to its own MAC address as the destination MAC address and to its GRE endpoint address as the destination IP address. Switch_1 120D may decapsulate the VXLAN encapsulated data packet, restoring the GRE encapsulated data packet. The GRE encapsulated data packet may be recirculated. During the second pass through the forwarding pipeline, the GRE encapsulated data packet may be decapsulated, based on the inner destination MAC address and destination IP address. Switch_1 120D may forward the data packet to host_1 110D.

FIG. 5B illustrates control information of a data packet after each pass through forwarding pipeline 242 of switch_1 120D. The data packet payload is not depicted. The IP addresses shown in FIG. 5B correspond to the IP address shown in FIG. 5A. Header 510 may be the data packet header received from host_1 110D. Header 510 may include destination address 512, source address 514, source IP address 516, and destination IP address 518.

During the first pass through switch_1's 120D forwarding pipeline, the packet may be encapsulated for GRE (a GRE header is added), resulting in header 520. The GRE header may include source IP address 526 and destination IP address 528. Destination address 522 and source address 524 may also be added.

During the second pass through switch_1's 120D forwarding pipeline 242, a VXLAN header may be added, resulting in header 530. The VXLAN header may include destination address 532, source address 534, source IP address 536, and destination IP address 538.

FIG. 5C illustrates configuration information 570 for GRE endpoint switch_1 110d and configuration information 580 for GRE endpoint switch_2 140D according to various embodiments. Configuration information 570 may set up a GRE tunnel; specify that the GRE endpoint is reachable over a VXLAN tunnel, and set the VXLAN tunnel. Configuration information 580 may set up a GRE tunnel.

FIG. 5D illustrates an example packet dump 590 in accordance with some embodiments. For example, packet dump 590 shows the addition of two tunnel headers by switch_1 120D.

VXLAN and GRE tunneling are provided above by way of example and not limitation. Other tunneling protocols may be used.

Network Device

Figure 6:
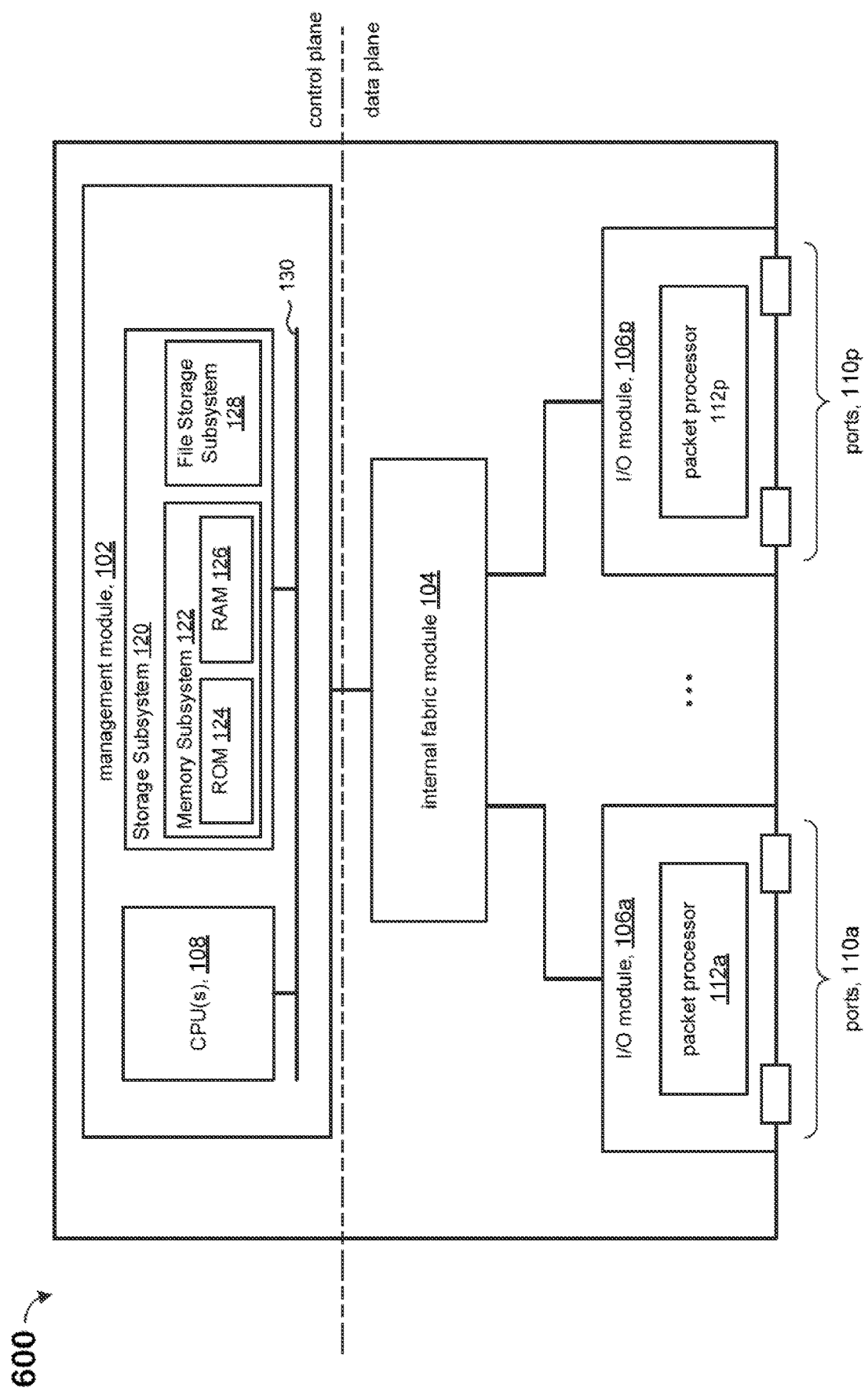
FIG. 6 illustrates a network device, in accordance with some embodiments of the disclosure.

FIG. 6 depicts an example of a network device 600 in accordance with some embodiments of the present disclosure. In some embodiments, network device 600 can be a switch. As shown, network device 600 includes a management module 102, an internal fabric module 104, and a number of I/O modules 106a-106p. Management module 102 includes the control plane (also referred to as control layer or simply the CPU) of network device 600 and can include one or more management CPUs 108 for managing and controlling operation of network device 600 in accordance with the present disclosure. Each management CPU 108 can be a general-purpose processor, such as an Intel®/AMD® x86 or ARM® microprocessor, that operates under the control of software stored in a memory, such as random access memory (RAM) 126. Control plane refers to all the functions and processes that determine which path to use, such as routing protocols, spanning tree, and the like.

Internal fabric module 104 and I/O modules 106a-106p collectively represent the data plane of network device 600 (also referred to as data layer, forwarding plane, etc.). Internal fabric module 104 is configured to interconnect the various other modules of network device 600. Each I/O module 106a-106p includes one or more input/output ports 110a-110p that are used by network device 600 to send and receive network packets. Input/output ports 110a-110p are also known as ingress/egress ports. Each I/O module 106a-106p can also include a packet processor 112a-112p. Each packet processor 112a-112p can comprise a forwarding hardware component (e.g., application specific integrated circuit (ASIC), field programmable array (FPGA), digital processing unit, graphics coprocessors, content-addressable memory, and the like) configured to make wire speed decisions on how to handle incoming (ingress) and outgoing (egress) network packets. In accordance with some embodiments some aspects of the present disclosure can be performed wholly within the data plane.

Management module 102 includes one or more management CPUs 108 that communicate with storage subsystem 120 via bus subsystem 130. Other subsystems, such as a network interface subsystem (not shown in FIG. 1), may be on bus subsystem 130. Storage subsystem 120 includes memory subsystem 122 and file/disk storage subsystem 128 represent non-transitory computer-readable storage media that can store program code and/or data, which when executed by one or more management CPUs 108, can cause one or more management CPUs 108 to perform operations in accordance with embodiments of the present disclosure.

Memory subsystem 122 includes a number of memories including main RAM 126 for storage of instructions and data during program execution and read-only memory (ROM) 124 in which fixed instructions are stored. File storage subsystem 128 can provide persistent (i.e., non-volatile) storage for program and data files, and can include a magnetic or solid-state hard disk drive, and/or other types of storage media known in the art.

One or more management CPUs 108 can run a network operating system stored in storage subsystem 120. A network operating system is a specialized operating system for network device 600 (e.g., a router, switch, firewall, and the like). For example, the network operating system may be Arista Extensible Operating System (EOS), which is a fully programmable and highly modular, Linux-based network operating system. Other network operating systems may be used.

Bus subsystem 130 can provide a mechanism for letting the various components and subsystems of management module 102 communicate with each other as intended. Although bus subsystem 130 is shown schematically as a single bus, alternative embodiments of the bus subsystem can utilize multiple busses.

What is claimed is:

1. A first network device comprising:
   at least one processor; and
   a memory communicatively coupled to the at least one processor, the memory storing instructions executable by the at least one processor to configure a data plane circuit to perform a method, the method comprising:
   receiving an unencapsulated first packet from a first host on an ingress port, the unencapsulated first packet being addressed to a second host;
   encapsulating the first packet for a first tunnel to produce an encapsulated first packet;
   recirculating the encapsulated first packet through a loopback port;
   further encapsulating the recirculated encapsulated first packet for a second tunnel to produce a twice-encapsulated first packet; and
   providing the twice-encapsulated first packet to a second network device for sending to the second host,
   wherein:
      the first host communicates with the second host through the first tunnel, and
      the first network device communicates with the second network device through the second tunnel.

2. The first network device of claim 1, wherein:
   the second network device partially decapsulates the twice-encapsulated first packet and provides the encapsulated first packet to a third network device, and
   the third network device further decapsulates the encapsulated first packet and provides the unencapsulated first packet to the second host.

3. The first network device of claim 1, wherein the first network device reaches the second network device through at least one intermediate network device.

4. The first network device of claim 2, wherein:
   encapsulating the unencapsulated first packet includes adding a first tunnel header to the unencapsulated first packet,
   the first tunnel header comprises a destination IP address and a source IP address,
   the destination IP address is a first tunnel endpoint IP address associated with the third network device, and
   the source IP address is a first tunnel endpoint IP address associated with the first network device.

5. The first network device of claim 4, wherein:
   encapsulating the unencapsulated first packet further includes adding a destination address to the unencapsulated first packet, and
   the destination address is a MAC address associated with the first network device or a MAC address associated with a next-hop network device.

6. The first network device of claim 1, wherein:
   encapsulating the recirculated encapsulated first packet includes adding a second tunnel header to the recirculated encapsulated first packet,
   the second tunnel header comprises a destination IP address and a source IP address,
   the destination IP address is a second tunnel endpoint IP address associated with the second network device, and
   the source IP address is a second tunnel endpoint IP address associated with the first network device.

7. The first network device of claim 1, wherein:
   encapsulating the recirculated encapsulated first packet further includes adding a destination address to the recirculated encapsulated first packet, and
   the destination address is a MAC address associated with a next-hop network device.

8. A method in a first network device comprising:
   receiving an original packet on an ingress port, the original packet being received from a first host and addressed to a second host;
   encapsulating the original packet to create a first tunnel encapsulated packet for a first tunnel;
   recirculating the first tunnel encapsulated packet through a loopback port of the first network device;
   additionally encapsulating the recirculated first tunnel encapsulated packet to create a second tunnel twice-encapsulated packet for a second tunnel; and
   egressing the second tunnel twice-encapsulated packet.

9. The method of claim 8 wherein:
   the second tunnel twice-encapsulated packet is received by a second network device,
   the second network device provides the first tunnel encapsulated packet to a third network device, and
   the third network device provides the original packet to the second host.

10. The method of claim 8 wherein:
   the first tunnel is based on a first tunneling protocol; and
   the second tunnel is based on a second tunneling protocol different from the first tunneling protocol.

11. The method of claim 10 wherein encapsulating the original packet for the first tunnel comprises:
   adding a first tunnel header to create the first tunnel encapsulated packet; and
   updating a destination Internet Protocol (IP) address of the first tunnel encapsulated packet.

12. The method of claim 10 further comprising:
   receiving an additional dual-encapsulated packet for the second tunnel from a fourth network device on another ingress port;

decapsulating the additional dual-encapsulated packet for the first tunnel to create an additional encapsulated packet;

recirculating the additional encapsulated packet through the loopback port of the first network device;

further decapsulating the additional encapsulated packet to create an additional unencapsulated packet; and egressing the additional unencapsulated packet.

13. The method of claim 8 wherein encapsulating the original packet for the first tunnel comprises:

adding a GRE header to the original packet; and updating a destination IP address of the original packet to be an address of a third network device.

14. The method of claim 13 wherein encapsulating the first tunnel encapsulated packet for the second tunnel comprises:

adding a VXLAN header to the first tunnel encapsulated packet; and updating the destination IP address of the second tunnel twice-encapsulated packet to be an address of a second network device.

15. A first network device comprising:

an ingress port, the ingress port receiving a first packet from a first host, the first packet being addressed to a second host;

a loopback port, the loopback port recirculating the first packet from a forwarding pipeline back into the forwarding pipeline;

the forwarding pipeline:

encapsulating the first packet in accordance with a VXLAN protocol to produce an encapsulated first packet during a first pass through the forwarding pipeline; and further encapsulating the encapsulated first packet in accordance with a GRE protocol to produce a dual-encapsulated first packet during a second pass through the forwarding pipeline; and an egress port, the egress port providing the dual-encapsulated first packet to a second network device.

16. The first network device of claim 15, wherein:

the second network device partially decapsulates the dual-encapsulated first packet and provides the encapsulated first packet to a third network device, and the third network device further decapsulates the encapsulated first packet and provides the first packet to the second host.

17. The first network device of claim 15, wherein the first network device reaches the second network device through at least one intermediate network device.

18. The first network device of claim 15, wherein:

encapsulating the first packet includes adding a VXLAN header to the first packet, the VXLAN header comprises a destination IP address and a source IP address, the destination IP address is a VXLAN tunnel endpoint IP address associated with a third network device, and the source IP address is a VXLAN tunnel endpoint IP address associated with the first network device.

19. The first network device of claim 18, wherein:

encapsulating the first packet further includes adding a destination address to the first packet, and the destination address is a MAC address associated with the first network device or a MAC address associated with a next-hop network device.

20. The first network device of claim 15, wherein:

further encapsulating the recirculated encapsulated first packet includes adding a GRE header to the recirculated encapsulated first packet, the GRE header comprises a destination IP address and a source IP address, the destination IP address is a GRE tunnel endpoint IP address associated with the second network device, and the source IP address is a GRE tunnel endpoint IP address associated with the first network device.

* * * * *